US011527810B2

(12) United States Patent
Locke et al.

(10) Patent No.: US 11,527,810 B2
(45) Date of Patent: Dec. 13, 2022

(54) LOW-PROFILE AUTOMOTIVE UNIVERSAL ANTENNA SYSTEM

(71) Applicants: Ford Global Technologies, LLC, Dearborn, MI (US); Ohio State Innovation Foundation, Columbus, OH (US)

(72) Inventors: John F. Locke, Waterford, MI (US); Chi-Chih Chen, Dublin, OH (US); Jiukun Che, La Jolla, CA (US)

(73) Assignees: FORD GLOBAL TECHNOLOGIES, LLC, Dearborn, MI (US); OHIO STATE INNOVATION FOUNDATION, Columbus, OH (US)

( * ) Notice: Subject to any disclaimer, the term of this patent is extended or adjusted under 35 U.S.C. 154(b) by 221 days.

(21) Appl. No.: 17/098,767

(22) Filed: Nov. 16, 2020

(65) Prior Publication Data

US 2022/0158325 A1 May 19, 2022

(51) Int. Cl.
*H01Q 1/36* (2006.01)
*H01Q 1/22* (2006.01)
(Continued)

(52) U.S. Cl.
CPC .............. *H01Q 1/2241* (2013.01); *H01Q 1/50* (2013.01); *H01Q 21/28* (2013.01); *H04B 7/0413* (2013.01)

(58) Field of Classification Search
CPC ........ H01Q 1/2241; H01Q 1/50; H01Q 21/28; H01Q 1/3275; H01Q 9/0407; H01Q 13/0275; H04B 7/0413
See application file for complete search history.

(56) References Cited

U.S. PATENT DOCUMENTS 6,433,756 B1 8/2002 Sievenpiper et al.
6,788,264 B2 * 9/2004 Du ...................... H01Q 9/0435
343/726
(Continued)

FOREIGN PATENT DOCUMENTS

CN 109193148 A 1/2019
EP 3680985 A1 7/2020

OTHER PUBLICATIONS

Chung et al, Design of an Ultrawide-Band TEM Horn Antenna With a Microstrip-Type Balun, IEEE Transactions on Antennas and Propagation, vol. 53, No. 10, Oct. 2005.
(Continued)

*Primary Examiner* — Dimary S Lopez Cruz
*Assistant Examiner* — Bamidele A Jegede
(74) *Attorney, Agent, or Firm* — Frank L. Lollo; MacMillan, Sobanski & Todd, LLC

(57) ABSTRACT

A multiband antenna comprises a dielectric substrate with a first surface defining an annular ledge and a central recess with a plurality of pockets. A MIMO radiator body is disposed in the central recess having a first surface defining a plurality of lobes which are disposed in respective ones of the plurality of pockets and having a second surface defining an outer rim and a central shelf. A radiator ring is disposed at the annular ledge so that the radiator ring and the outer rim converge along an annular gap therebetween. A plurality of MIMO feed lines provide external connection to respective lobes. The MIMO radiator body and the radiator ring provide a substantially horizontally-directed radiation pattern (e.g., for terrestrial signals). At least one low-profile radiator on the central shelf provides a substantially circularly polarized or vertically-directed radiation pattern for receiving signals radiated from a satellite.

20 Claims, 11 Drawing Sheets

(51) Int. Cl.
*H01Q 1/50* (2006.01)
*H01Q 21/28* (2006.01)
*H04B 7/0413* (2017.01)

(56) References Cited

U.S. PATENT DOCUMENTS

| | | | | |
|---|---|---|---|---|
| 6,809,686 | B2* | 10/2004 | Du | H01Q 9/0464 |
| | | | | 343/846 |
| 9,509,062 | B2 | 11/2016 | Jervis et al. | |
| 10,153,551 | B1* | 12/2018 | Hong | H01Q 19/005 |
| 11,349,201 | B1* | 5/2022 | Parrow | H01Q 11/08 |
| 2003/0177010 | A1* | 9/2003 | Locke | H01Q 19/005 |
| 2004/0239568 | A1* | 12/2004 | Masutani | H01Q 9/0464 |
| | | | | 343/846 |
| 2004/0246181 | A1* | 12/2004 | Fukushima | H01Q 9/0435 |
| | | | | 343/846 |
| 2004/0263406 | A1* | 12/2004 | Colburn | H01Q 9/27 |
| | | | | 343/895 |
| 2006/0097924 | A1* | 5/2006 | Yegin | H01Q 5/378 |
| | | | | 343/700 MS |
| 2008/0018549 | A1* | 1/2008 | Suzuki | H01Q 9/0407 |
| | | | | 343/841 |
| 2012/0268347 | A1* | 10/2012 | Tatarnikov | H01Q 13/106 |
| | | | | 343/893 |
| 2013/0135161 | A1* | 5/2013 | Fujimoto | H01Q 5/40 |
| | | | | 343/725 |
| 2015/0214634 | A1* | 7/2015 | Lee | H01Q 9/065 |
| | | | | 343/797 |
| 2016/0064830 | A1* | 3/2016 | Jervis | H01Q 9/285 |
| | | | | 343/798 |
| 2018/0040956 | A1* | 2/2018 | Lee | H01Q 9/16 |
| 2019/0348754 | A1 | 11/2019 | Apostolos et al. | |
| 2020/0243942 | A1* | 7/2020 | Fuchs | H01Q 1/48 |

OTHER PUBLICATIONS

Weijie Gao et al, Horizontally Polarized 360° Beam-Steerable Frequency-Reconfigurable Antenna, IEEE Transactions on Antennas and Propagation, vol. 67, No. 8, Aug. 2019.

Zhou Lei et al, A Broadband Horizontally Polarised Omnidirectional Antenna with Stable Radiation Patterns, The Journal of Engineering, IET International Radar Conference (IRC 2018).

* cited by examiner

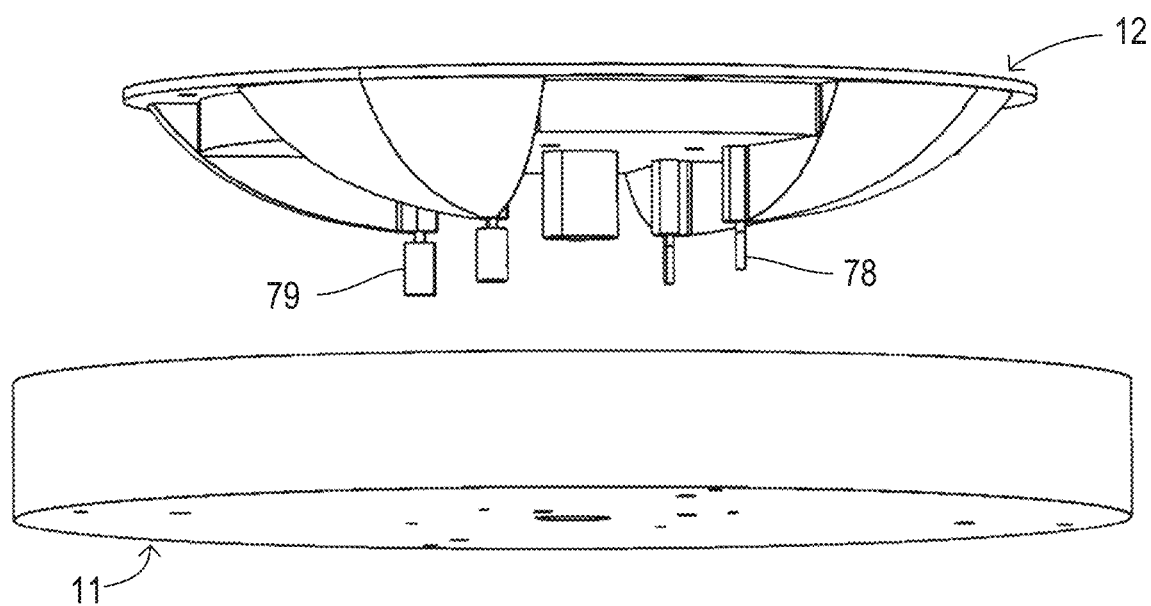
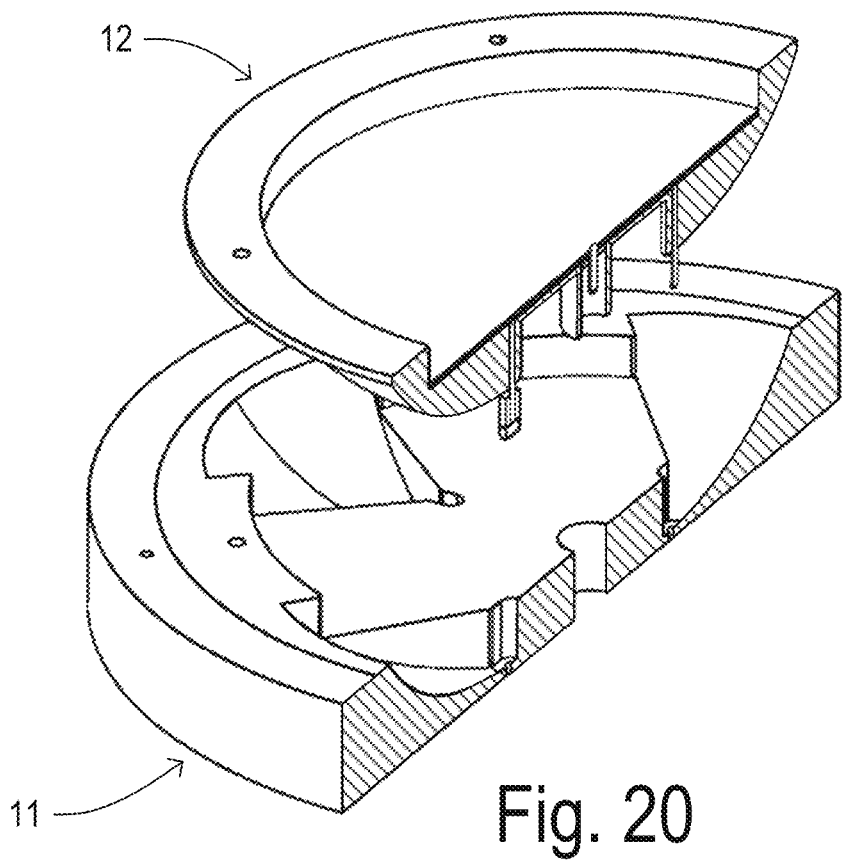

LOW-PROFILE AUTOMOTIVE UNIVERSAL ANTENNA SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to antennas for wireless communication, and, more specifically, to automotive antennas having a low profile and providing reception/transmission across multiple terrestrial and satellite radio services.

With the proliferation of wireless systems being deployed in automotive vehicles, the requirements for vehicle mounted antennas has significantly increased. A typical vehicle may include a cellular transceiver, a Wi-Fi hotspot, an ultra-wideband (UWB) transmitter or transceiver, a V2V or V2X transceiver, a global navigation satellite system (GNSS) receiver, a terrestrial radio broadcast (AM/FM) receiver, a satellite digital audio radio service (SDARS) receiver, and others. Because of different frequency bands and other signal properties, many separate antennas are usually deployed at different locations in the vehicle for the different wireless systems. Thus, the required antenna system represents a significant impact on parts cost, manufacturing/assembly cost, and packaging cost, and the presence of numerous antenna elements may detract from the visual appearance of the vehicle.

Some antennas have been formed as metal traces on the windows of the vehicle, and although on-glass antennas conform to the surface of the vehicle they have provided limited performance (e.g., poor directionality) and are not capable of being used for all of the various radio services. Other types of antenna elements such as masts or "shark fin" antennas which protrude from the surface are subject to breaking off or damage (especially during shipment of newly manufactured vehicles) and can detract from the look of a vehicle. Furthermore, known systems attempting to combine antenna elements for multiple different communication services have been subject to low gain, low efficiency, and poor coverage.

Thus, it would be advantageous to provide a compact antenna which is conformal to a vehicle surface (i.e., has thin, low-profile form factor) and which functions for multiple wireless applications in a single unit.

SUMMARY OF THE INVENTION

In one aspect of the invention, a multi-band antenna comprises a disk-shaped dielectric substrate with a first surface defining an annular ledge and a central recess with a plurality of pockets. A disk-shaped MIMO radiator body is disposed in the central recess having a first surface defining a plurality of lobes configured to be disposed in respective ones of the plurality of pockets and having a second surface defining an outer rim and a central shelf. A radiator ring is disposed at the annular ledge so that the radiator ring and the outer rim converge along an annular gap therebetween. A plurality of MIMO feed lines provide external connection to respective lobes, wherein the MIMO radiator body and the radiator ring provide a substantially horizontally-directed radiation pattern (e.g., for terrestrial signals). At least one low-profile radiator is disposed over the central shelf providing a substantially circularly polarized or vertically-directed radiation pattern for receiving signals radiated from a satellite. There may be a plurality of separate low-profile radiators connected in parallel to provide reception in multiple different radio services or bands such as GNSS and SDARS.

BRIEF DESCRIPTION OF THE DRAWINGS

FIG. 19 is another perspective view of the terrestrial section of FIG. 6.

FIG. 20 is an exploded, cross-sectional view of the portions of the terrestrial section of FIG. 6.

DETAILED DESCRIPTION OF PREFERRED EMBODIMENTS

Figure 1:
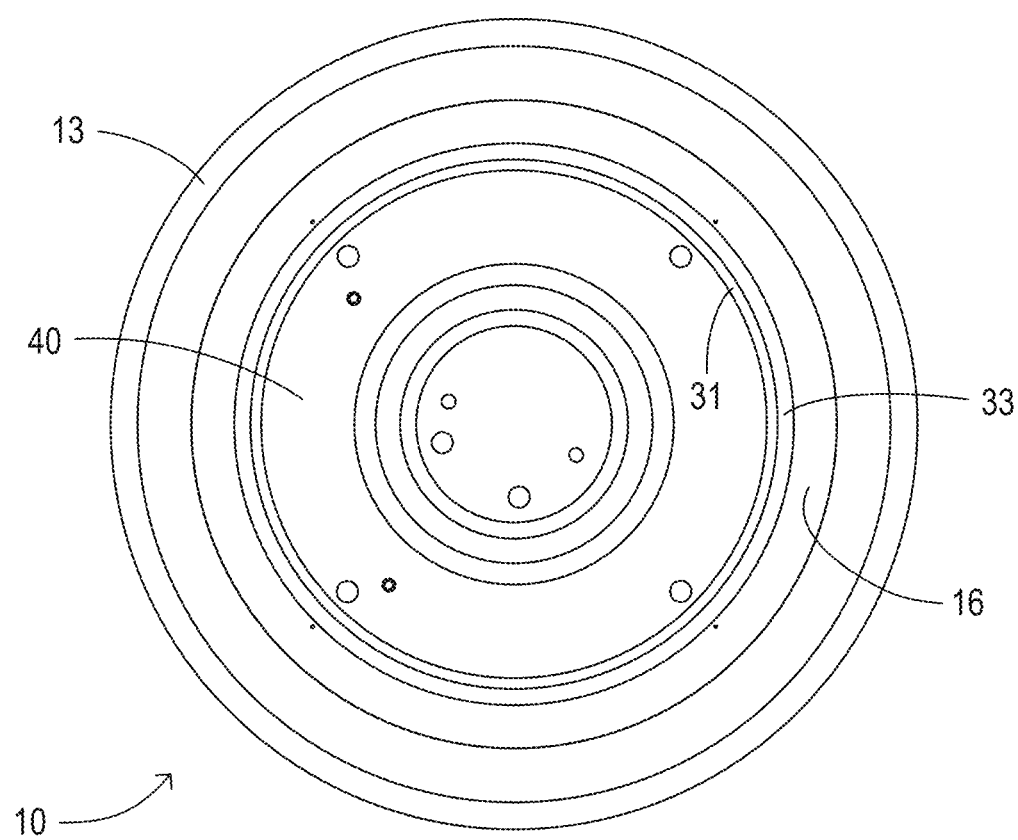
FIG. 1 is a top view of an antenna system of the present invention.

The invention provides an antenna system combining radiator elements for multiple wireless services in a compact unit with a low profile (e.g., having a disk-shape which is about 6 inches in diameter and less than about 1 inch thick). Even with such a low profile, the directivity and/or polarization of RF signals for different wireless services (e.g., terrestrial and satellite) can be provided by different sections of the unit. The unit can be mounted within a vehicle roof (e.g., flush with the roof line), under any RF transmissive surface (e.g., beneath a glass sunroof), or on or under any other generally horizontal surface. By providing wide-bandwidth antenna elements, a reduced number of coaxial cables can be used to distribute the antenna signals among the vehicle-mounted wireless systems while still providing multiple-input multiple-output diversity and/or multiplexing.

A first embodiment of an antenna system 10 according to the invention is shown in FIGS. 1-4. A disk-shaped dielectric substrate 11 receives a disk-shaped to MIMO radiator body 12 on one side and is supported in a cavity of a ground plate 13. Dielectric substrate 11 is comprised of a solid body of dielectric material (such as PTFE or other thermoplastic) with an upper surface 14 and a lower surface 15. Lower surface 15 may be shaped to conform to the shape of ground plate 13 (e.g., an upturned outer edge such that plate 13 radially contains dielectric substrate 11 and MIMO radiator body 12). Upper surface 14 defines an annular ledge which carries a radiator ring 16. Radiator ring 16 may be comprised of a conductive trace or coating (e.g., copper, brass, or aluminum) that continuously extends around the annular ledge and is separated from radiator body 12 by a gap. A pair of shorting pins 24 are made of conductive material (e.g., metal) and may pass through respective passages in substrate 11 to connect between radiator ring 16 and ground plate 13.

Figure 2:
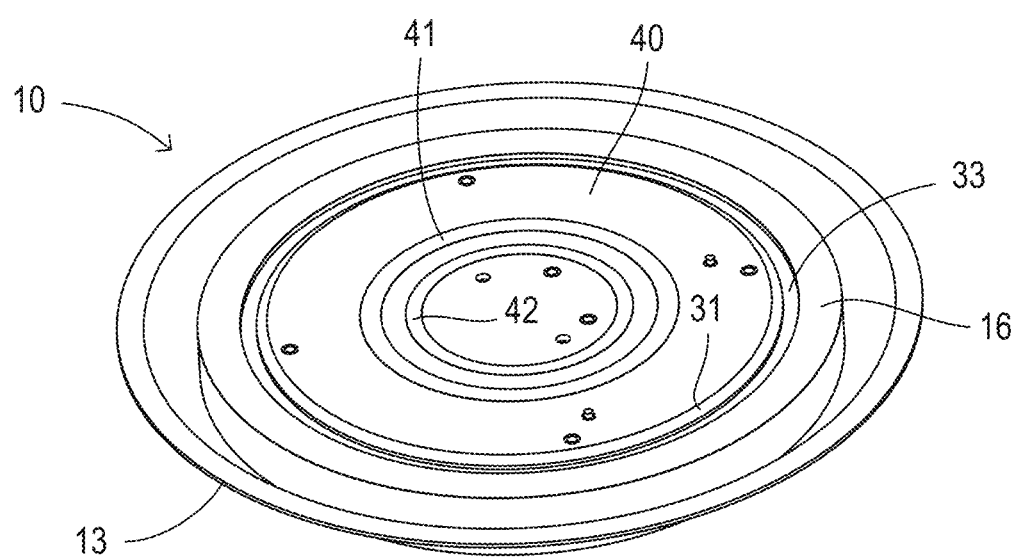
FIG. 2 is a perspective view of an antenna system of FIG. 1.
Figure 3:
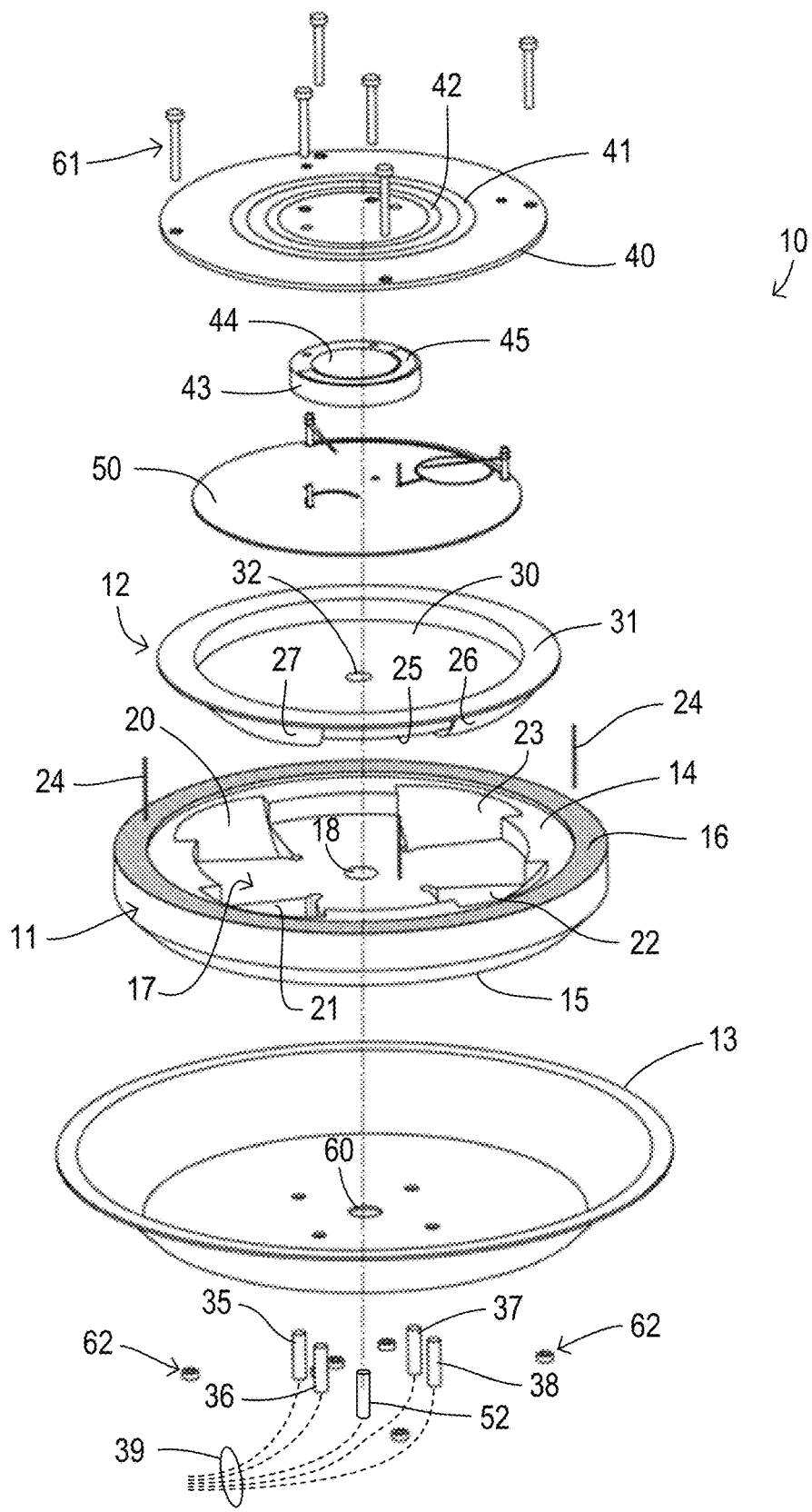
FIG. 3 is an exploded, perspective view of the antenna system of FIG. 1.
Figure 4:
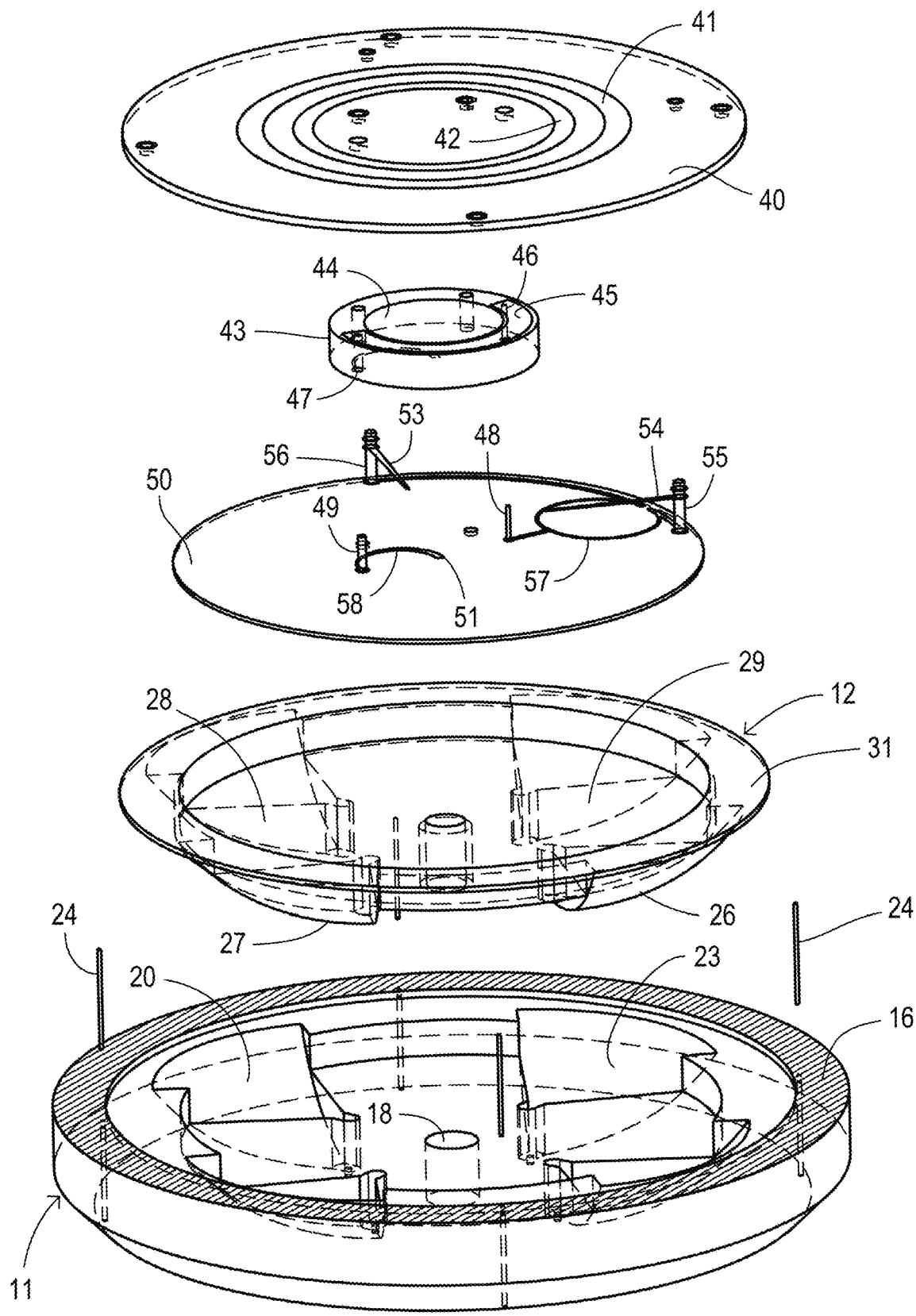
FIG. 4 is an exploded view showing elements of FIG. 3 in greater detail.
Figure 5:
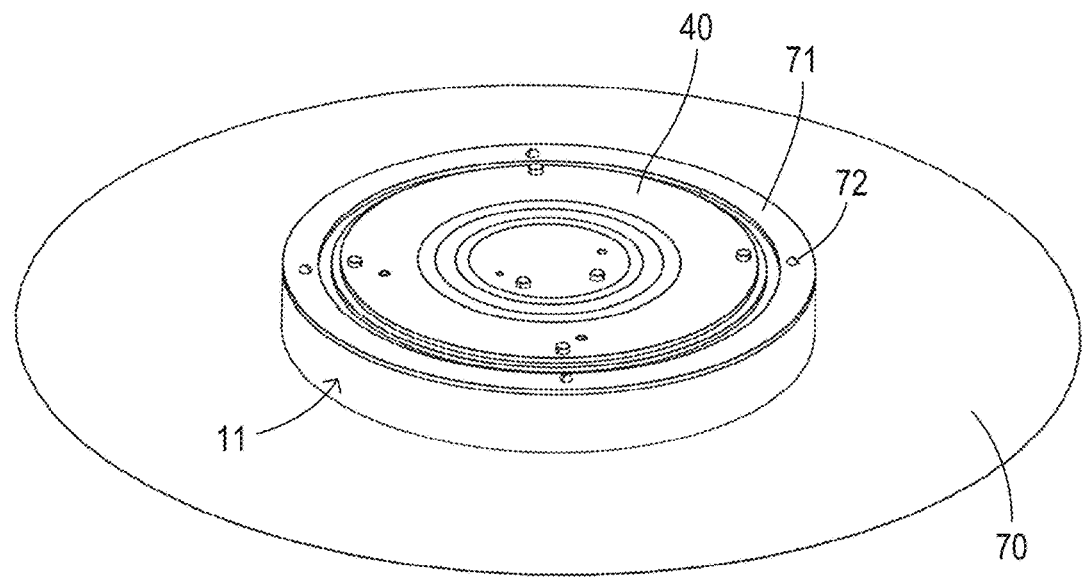
FIG. 5 is a perspective view of an antenna system according to another embodiment.

Upper surface 14 further includes a central recess 17 and a center aperture 18. Recess 17 defines a plurality of pockets 20, 21, 22, and 23 configured to receive respective features of MIMO radiator body 12. Radiator body 12 has a lower surface 25 defining a plurality of lobes 26, 27, 28, and 29 configured to be disposed in respective ones of the plurality of pockets 20-23. MIMO radiator body 12 has a upper surface defining a central shelf 30 and an outer rim 31. A center aperture 32 passes through radiator body 12. Preferably, radiator body 12 is comprised of an insulative core with a conductive outer cladding (e.g., a molded thermoplastic core coated with a copper, brass, or aluminum layer which may be about 0.002 inches thick). Radiator ring 16 is disposed circumferentially around outer rim 31 so that radiator ring 16 and outer rim 31 converge along an annular gap 33 therebetween (FIGS. 1 and 2).

Lobes 26, 27, 28, and 29 have substantially identical shapes, wherein each has a radially-inward feed point and a transverse dimension that increases with increasing radial distance from the feed point in order to form a wideband transverse electromagnetic (TEM) horn element. Furthermore, each TEM horn element 26-29 may have a 3D surface with an exponential profile which is also swept along the z-axis (i.e., a vertical axis at the feed tip) to achieve stable patterns over a very wide frequency range. For example, the profile may be characterized by the formula $z=0.1*(\exp(83.5x)-1)$. The exponential profile is optimized according to the desired frequency range and physical constraints. Each feed point can be connected to a respective coaxial cable/transmission line for providing a respective channel of the MIMO antenna. The size/configuration of lobes 26-29 may be preferably radiate in a plurality of terrestrial wireless bands (e.g., 700 MHz to 6 GHz) including WLAN, V2X, and a high band of cellular service. The partial bowl shape of each lobe 26-29 is a flaring waveguide surface that functions as a half tapered-horn antenna element. Working together with substrate 11 and radiator ring 16, lobes 26-29 function as a dielectric-loaded tapered horn array. Electrical continuity between lobes 26-29 joins them in an Alford loop arrangement. The shorting of radiator ring 16 by pins 24 causes it to work together with lobes 26-29 to radiate at the lower band of cellular (via a mechanism which can be regarded as a planar inverted-F antenna, or PIFA). The combined properties of tapered-horn type and Alford-type antenna elements results in a compact-size, high-gain antenna with propagation characteristics ideally suited for terrestrial, MIMO applications.

Lobes 26-29 can be operated in a MIMO mode or in a common mode. In the MIMO mode, each lobe is activated separately such that each lobe radiates/receive signals from a respective angular sector. In the common mode, all four lobes are activated simultaneously (e.g., their feed lines are combined) so that they jointly radiate/receive a relatively uniform pattern over 360 degrees azimuthal angles and over the entire frequency range of operation.

To make external connections to one or more wireless receives and/or transmitters in the vehicle, a plurality of MIMO feed lines 35-38 connect to lobes 26-29, respectively. Each line 35-38 may be comprised of a coaxial cable with a center conductor mounted in a socket formed as the base of the respective lobe. Cables 35-38 join an electrical distribution system (e.g., wiring harness) 39 for transmitting RF signals to/from the wireless systems.

To provide operation in additional RF bands and/or different wireless services (e.g., satellite services), additional radiators may be accommodated within the space created by central shelf 30 and outer rim 31 of MIMO radiator body 12 (e.g., central shelf 30 is preferably sunken with respect to rim 31). For example, at least one planar radiator may be disposed over central shelf 30 to provide a radiation pattern for receiving signals radiated from a satellite transmitter. Such a radiation pattern may be a substantially circularly polarized pattern and/or a vertically-directed pattern. In particular, satellite services may include a global navigation satellite system (GNSS) such as GPS, Galileo, GLONASS, and BDS, and a satellite digital audio radio service (SDARS) such as SiriusXM. In the embodiment shown in FIGS. 1-4, radiators for both GNSS and SDARS are incorporated which fit together in the space and which share an external feed line.

For GNSS reception, a nonconductive board 40 carries two conductive rings or patches (e.g., printed traces) 41 and 42 on the top side. For SDARS reception, an insulative (i.e., nonconducting) disk 43 carries a patch 44, which may be circular, and a C-shape ring 45 which acts as a coupling line to patch 44. A capacitive gap between patch 44 and C-shape ring 45 allows the field to gradually couple to patch 44 from C-shape ring 45 thereby exciting a circular polarization. Disk 43 has through-holes 46 and 47 which receive conductive pins 48 and 49 which connect opposite ends of C-shape ring 45 to a feeding board 50. Feeding board 50 is a printed circuit board for providing a coupling circuit (including a trace 58) with an output termination 51 at the center of board 50 where an output conductor (e.g., the center conductor of a coaxial cable 52) transmits the received GNSS and SDARS signals to the respective wireless receivers. The output terminal and/or the coaxial cable extends through apertures 32, 18, and an aperture 60 is ground plate 13 to conduct a shared output signal for the circularly-polarized/vertically-directed satellite signals.

Rings 41 and 42 for GNSS signals are fed by conductive probes 53 and 54 on the bottom side of board 40. Although shown separately from board 40 in the exploded view, probes 53 and 54 may be comprised of conductive traces deposited on board 40, for example, even though there is no direct connection to rings 41 and 42. Probes 53 and 54 create a capacitive feed, and they are connected via conductive pins 55 and 56 to traces 57 on feeding board 50. Traces 57 couple probes 53 and 54 to conductive pin 48 so that the received GNSS signals may be conducted by C-shape ring 45, pin 49, and a conductive trace 58 to output termination 51. For example, trace 58 is configured as an impedance transformer microstrip line (e.g., converting a 50 ohm impedance of a coaxial cable to the impedance of patch 44). Traces 57 also include a power divider (e.g., a Wilkinson power divider) and a phase delay line so that probes 53 and 54 feed dual rings 41/42 at orthogonal positions to generate the desired right-hand circular polarization for GNSS reception.

The planar radiator circuits (e.g., GNSS and SDARS antennas together with a feeding board) are nested on top of MIMO radiator body 12, and the antenna system 10 is held together by a plurality of nonconductive screws 61 and nonconductive nuts 62 (e.g., both comprised of nylon) which pass through respective bores in board 40, disk 43, board 50, MIMO body 12, dielectric substrate 11 and grounding plate 13.

FIGS. 5-20 show another embodiment in which many parts are identical to the previous embodiment and are given the same reference numerals. In this embodiment, a grounding plate 70 is a flat disk for supporting dielectric substrate 11. In addition, a separate radiator ring 71 is provided instead of an integrated coating or trace formed on the annular ledge of dielectric substrate 11. Radiator ring 71 may be formed of a conductive metal and has shorting pins 72 that extend through apertures in substrate 11 to be joined to grounding plate 70.

Figure 6:
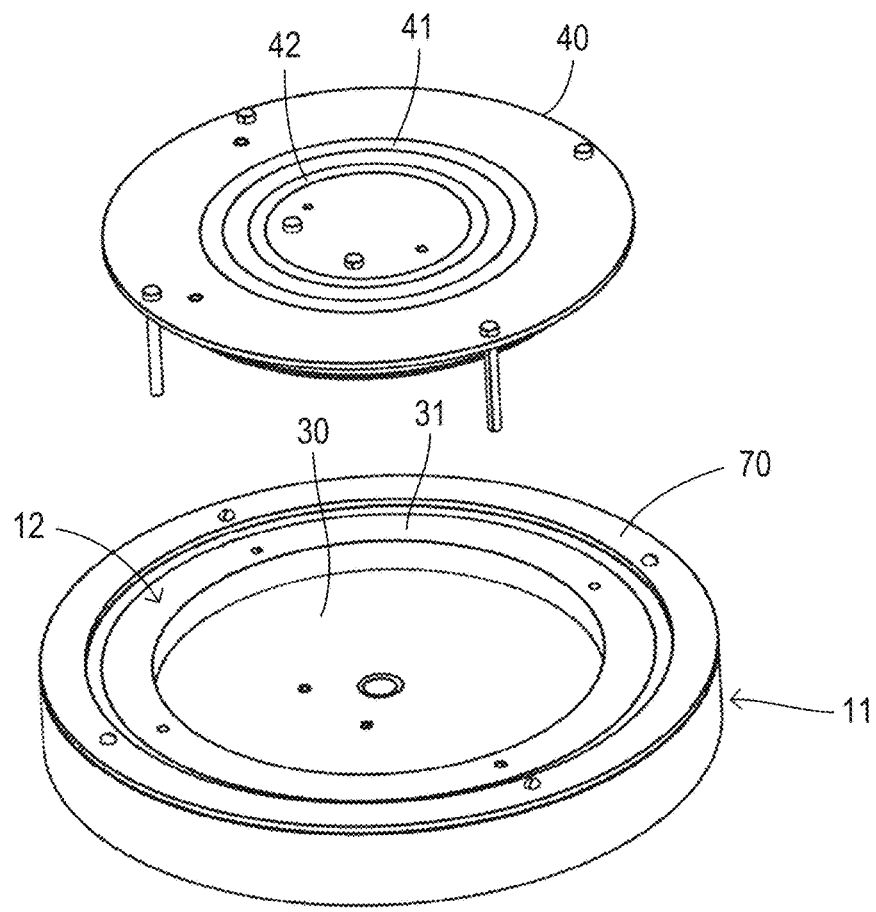
FIG. 6 is a partially exploded view showing separate satellite and terrestrial sections of the antenna system of FIG. 5.
Figure 7:
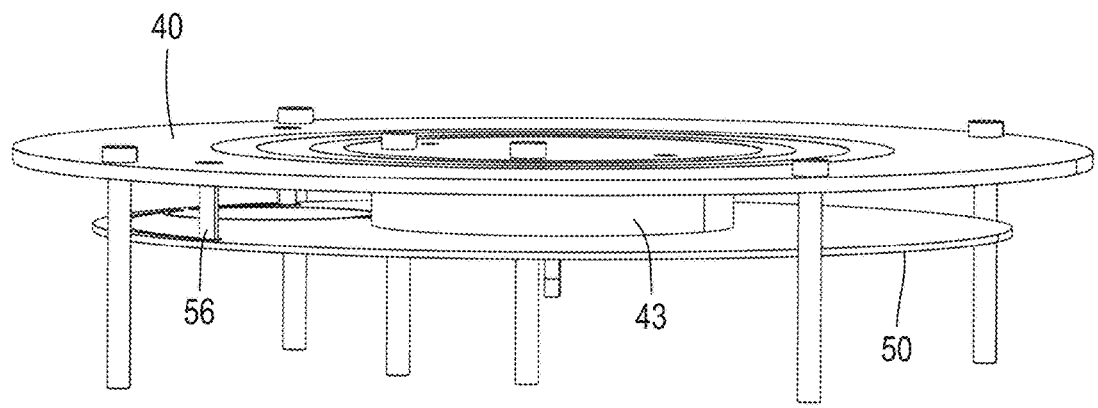
FIG. 7 is a side perspective view of the satellite section of FIG. 6.
Figure 8:
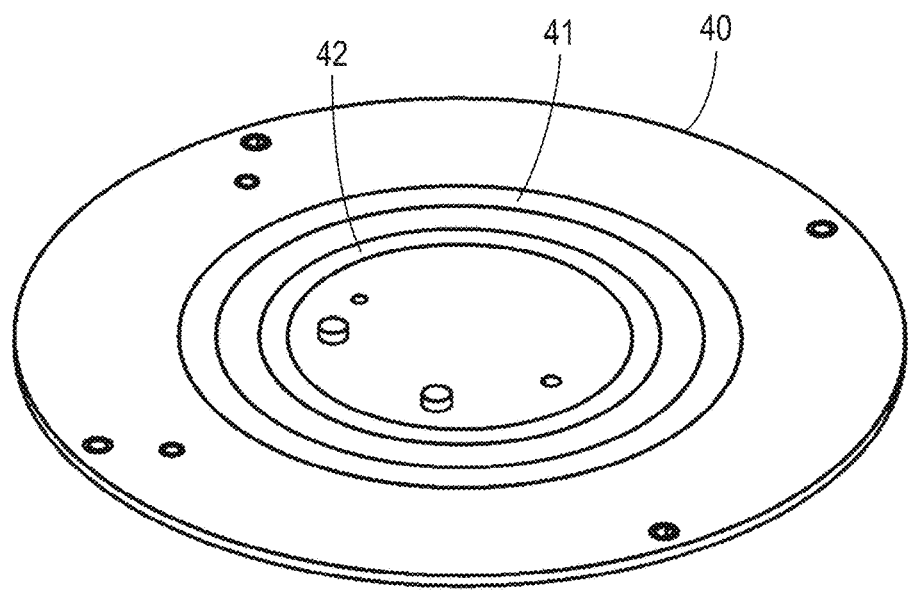
FIG. 8 is a top perspective view of the satellite section of FIG. 6.
Figure 11:
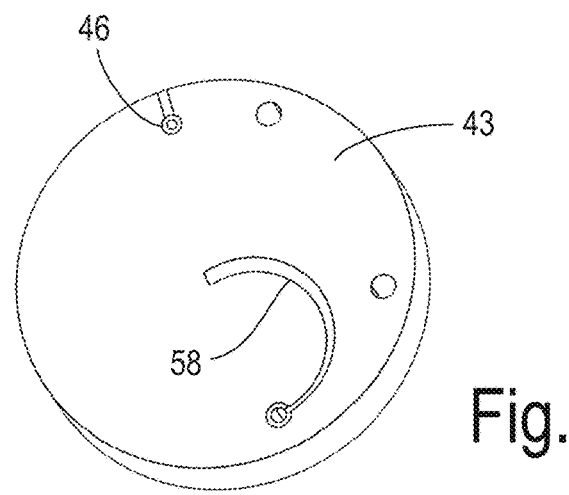
FIG. 11 is a bottom view of an insulative disk of the satellite section of FIG. 6.
Figure 9:
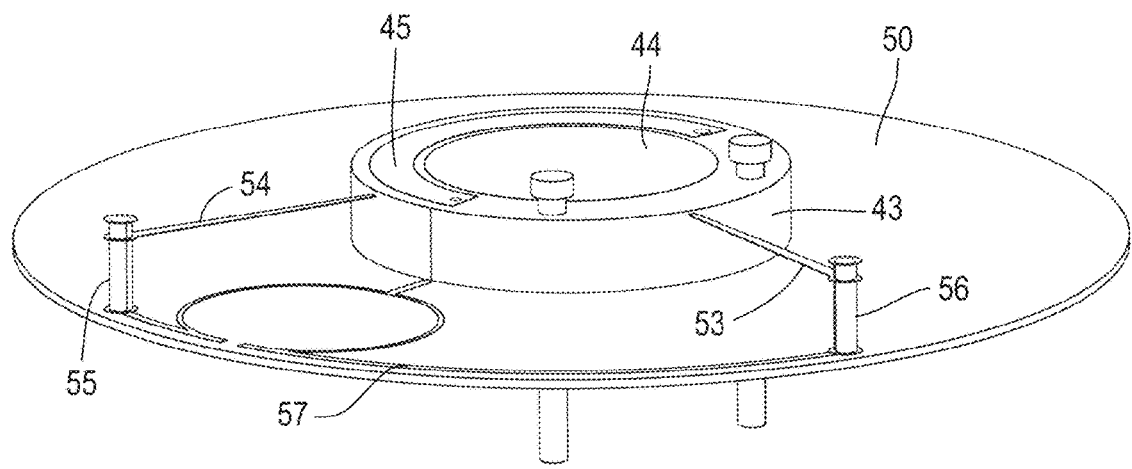
FIGS. 9 and 10 are side perspective views of the satellite section of FIG. 6 with certain portions being removed.
Figure 10:
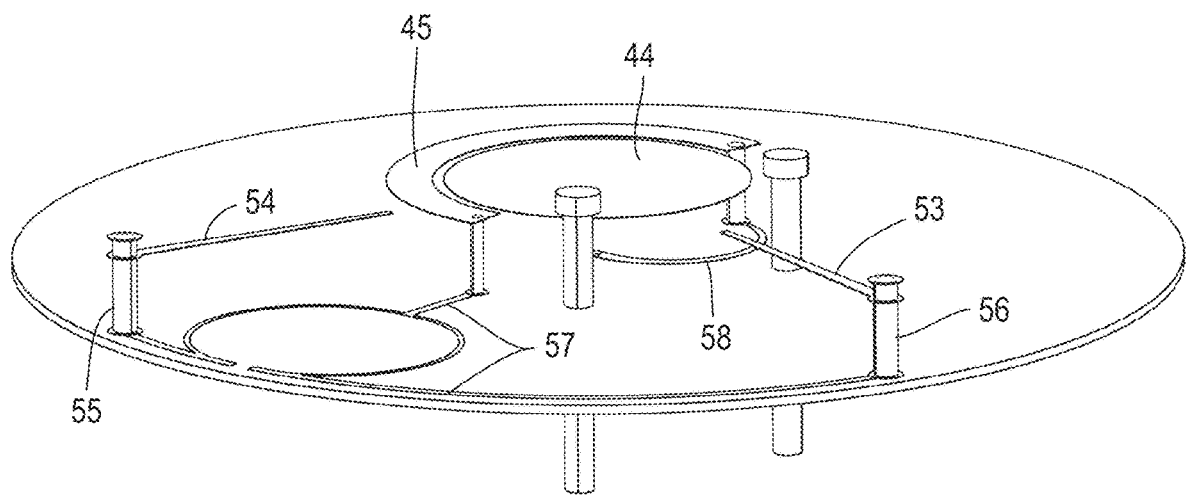
Figure 12:
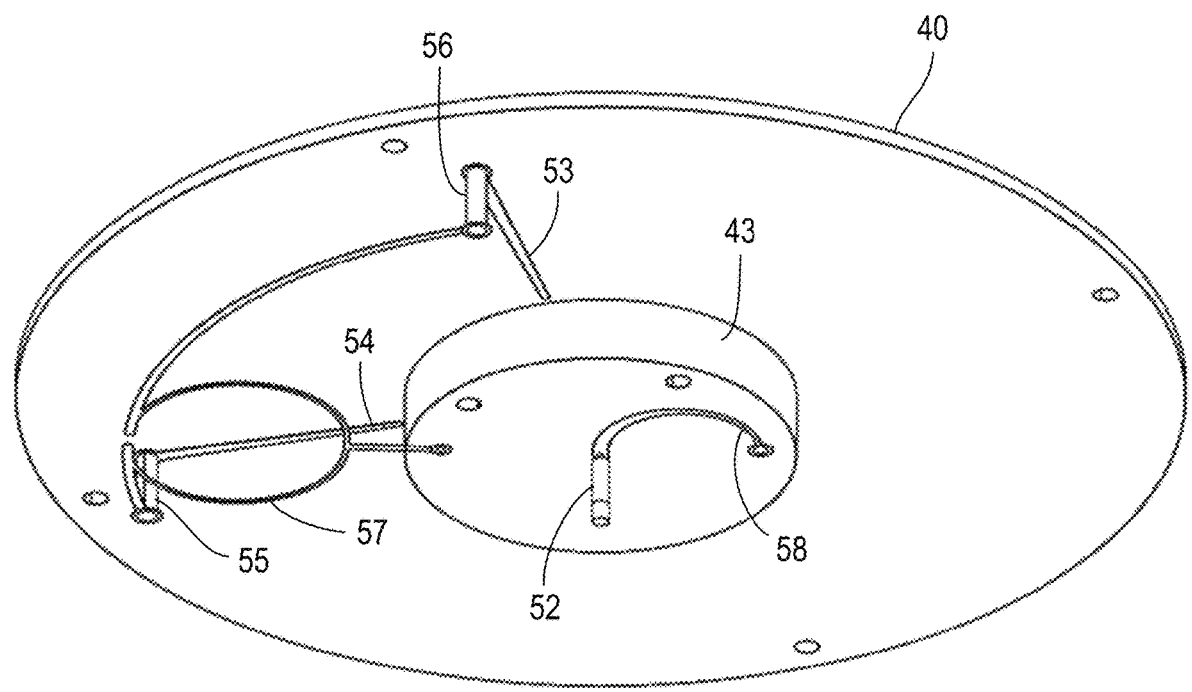
FIGS. 12 and 13 are perspective views of the satellite section of FIG. 6 with certain other portions being removed.
Figure 13:
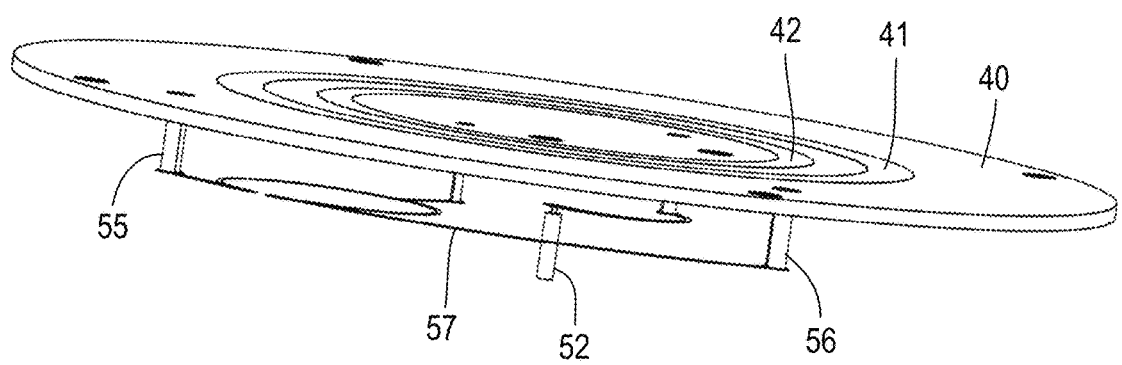
Figure 14:
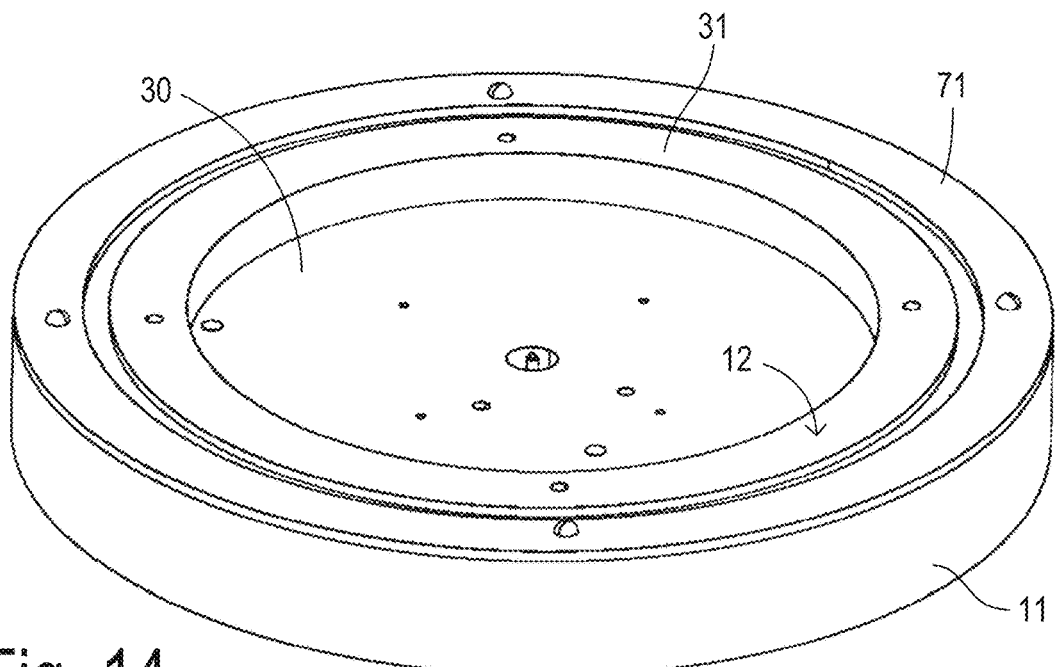
FIG. 14 is a perspective view showing the terrestrial section of FIG. 6 in greater detail.
Figure 15:
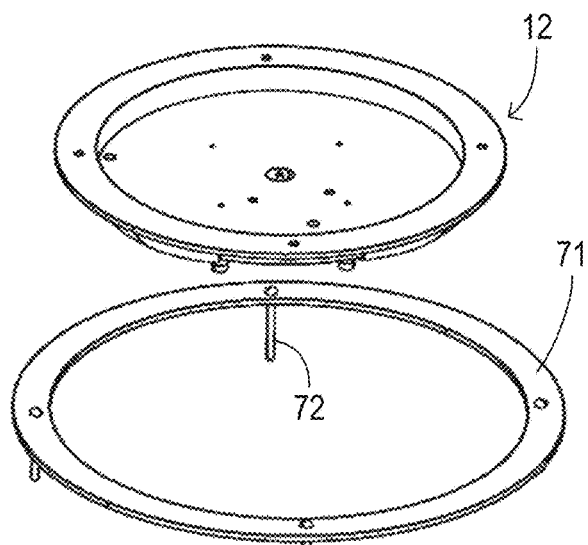
FIG. 15 is an exploded, top perspective view of the terrestrial section of FIG. 6.
Figure 15:
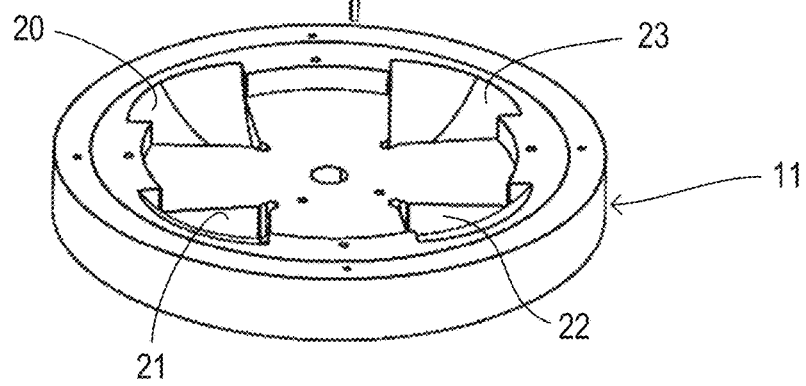
Figure 16:
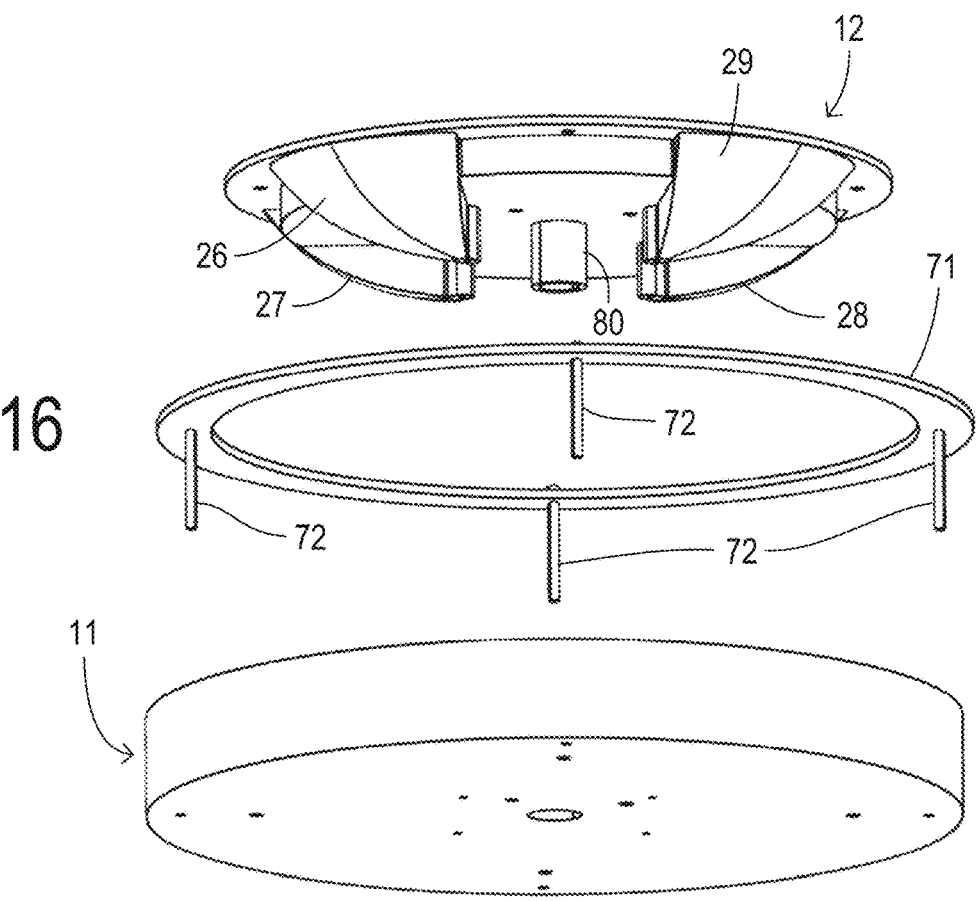
FIG. 16 is an exploded, bottom perspective view of the terrestrial section of FIG. 6.
Figure 17:
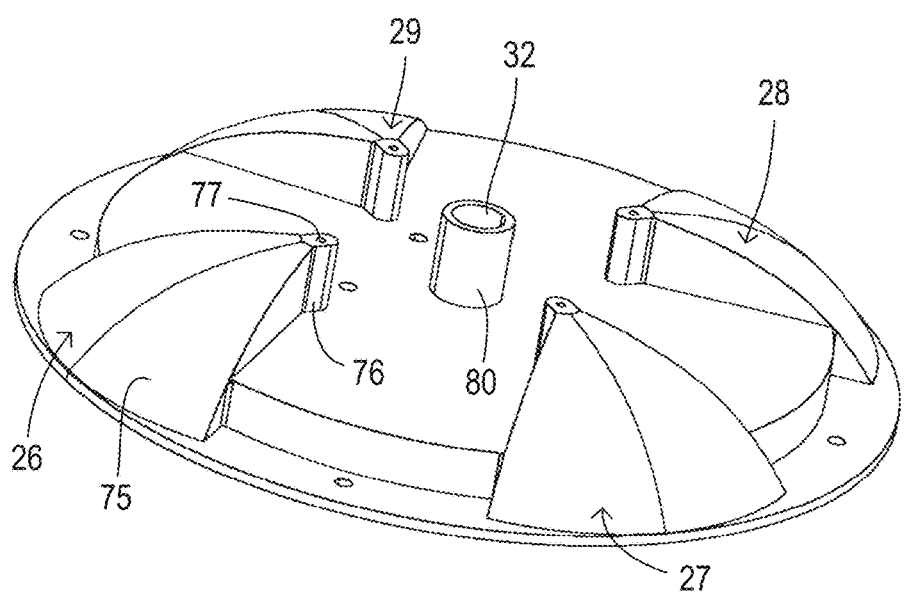
FIG. 17 is a bottom perspective view of a MIMO radiator body.
Figure 18A:
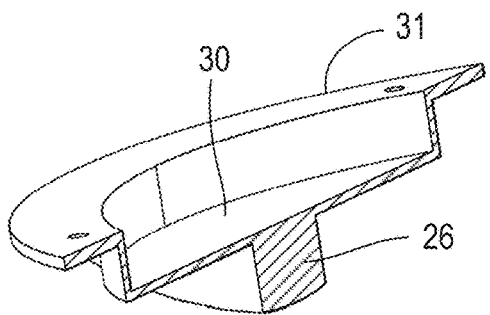
FIGS. 18A-18D are cross-sectional views of the MIMO radiator body of FIG. 17.
Figure 18B:
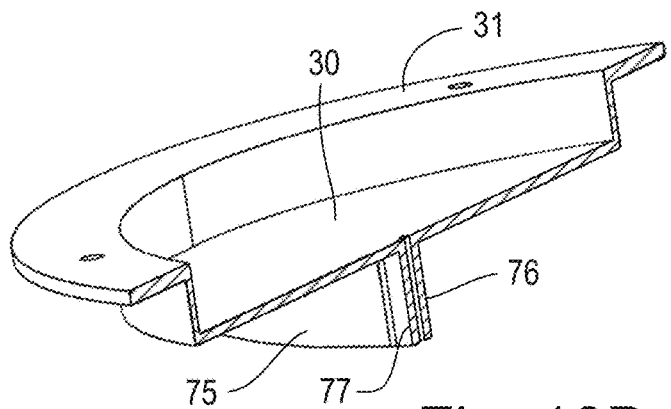
Figure 18C:
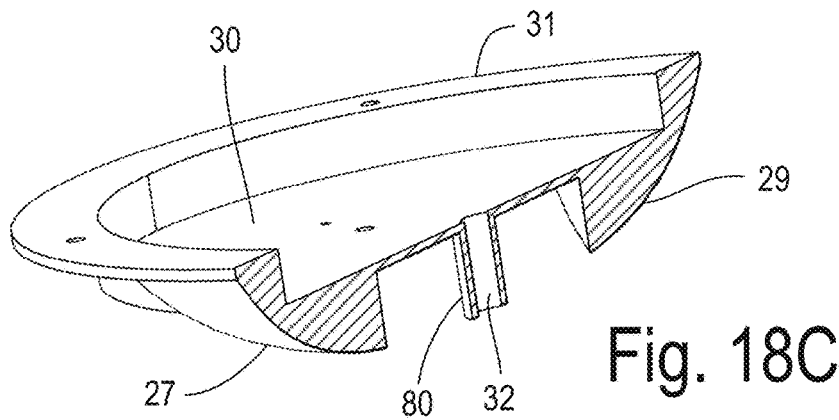
Figure 18D:
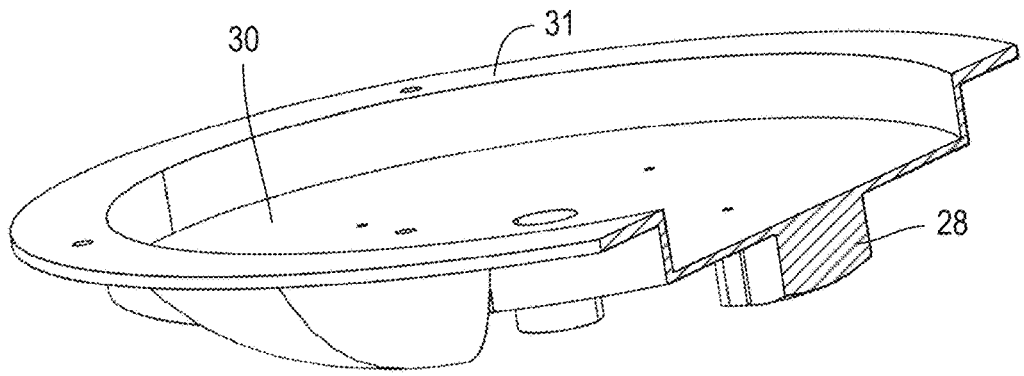

FIG. 6 breaks out the terrestrial (combined tapered-horn and Alford loop type) antenna section from the satellite (planar or patch type) antenna sections which fit together in a compact, nested configuration.

FIGS. 17 and 18A-18D show the shapes of lobes 26-29 in greater detail. For example, lobe 26 has a flared, sloping horn section 75 extending from a hub section 76. The surface edges shown by the various cross sections of FIGS. 18A to 18D depict the changing shape of the conductive radiator portion of lobe 26 which does not include the center core away from the coated edges. Aperture 32 passes through a collar 80. Hub section 76 has a connection socket 77 for receiving a respective feed line such as a feed pin 78 shown in FIG. 19. Feed pin 78 may be retained in an insulating spacer 79. Spacer 79 may provide a connector structure for coupling to a coaxial cable, for example.

What is claimed is:

1. A multi-band antenna comprising:
   a disk-shaped dielectric substrate with a first surface defining an annular ledge and a central recess with a plurality of pockets;
   a disk-shaped MIMO radiator body disposed in the central recess having a first surface defining a plurality of lobes configured to be disposed in respective ones of the plurality of pockets and having a second surface defining an outer rim and a central shelf;
   a radiator ring disposed at the annular ledge so that the radiator ring and the outer rim converge along an annular gap therebetween;
   a plurality of MIMO feed lines providing external connection to respective lobes, wherein the MIMO radiator body and the radiator ring provide a substantially horizontally-directed radiation pattern; and
   at least one low-profile radiator disposed over the central shelf providing a substantially circularly polarized or vertically-directed radiation pattern for receiving signals radiated from a satellite.

2. The antenna of claim 1 wherein each of the plurality of lobes is configured as a transverse electromagnetic (TEM) horn.

3. The antenna of claim 2 wherein the horns is joined in an Alford loop arrangement.

4. The antenna of claim 1 wherein the radiator ring is shorted to a ground reference, and wherein the annular gap configures the dielectric substrate, MIMO radiator body, and radiator ring as a tapered-horn array.

5. The antenna of claim 1 wherein the dielectric substrate is comprised of thermoplastic.

6. The antenna of claim 5 wherein the thermoplastic is comprised of PTFE.

7. The antenna of claim 1 wherein the MIMO radiator body is comprised of an insulative core with a conductive outer cladding.

8. The antenna of claim 1 wherein the at least one low-profile radiator is comprised of a C-shape ring feeding a circular patch configured to receive signals from a satellite digital audio radio service (SDARS).

9. The antenna of claim 1 wherein the at least one low-profile radiator is comprised of a pair of concentric ring conductors on an insulative circuit board configured to receive signals from a global navigation satellite system (GNSS).

10. The antenna of claim 1 wherein the at least one low-profile radiator is comprised of a C-shape ring adjacent a circular patch which are disposed on an insulative disk and configured to receive signals from a satellite digital audio radio service (SDARS), and wherein the antenna further comprises: a feeding board upon which the insulative disk is mounted, wherein the feeding board includes conductive traces in electrical connection with opposing ends of the C-shape ring; an insulative circuit board suspended over the insulative disk and the feeding board; a pair of concentric ring conductors on a first side of the circuit board configured to receive signals from a global navigation satellite system (GNSS); and a pair of conductive probes disposed at a second side of the circuit board and configured to capacitively couple to the pair of concentric ring conductors, wherein the conductive probes are electrically connected to the C-shape ring; wherein the feeding board and the insulative circuit board are nested within the outer rim on the central shelf of the MIMO radiator body.

11. The antenna of claim 1 further comprising a ground plate adjacent a second surface of the dielectric substrate, wherein the ground plate includes a plurality of apertures to accommodate respective coaxial cables for connecting to respective MIMO feed lines and to a feed line for the low-profile radiator.

12. The antenna of claim 11 wherein the ground plate has an upturned outer edge radially containing the dielectric substrate and MIMO radiator body.

13. An automotive antenna system comprising:
   a disk-shaped dielectric substrate with an upper surface defining an annular ledge and a central recess with a plurality of pockets;
   a disk-shaped MIMO radiator body disposed in the central recess having a lower surface defining a plurality of lobes configured to be disposed in respective ones of the plurality of pockets and having an upper surface defining an outer rim and a sunken central shelf, wherein the lobes are joined in an Alford loop configuration;
   a radiator ring disposed at the annular ledge so that the radiator ring and the outer rim converge along an annular gap therebetween, wherein the dielectric substrate, MIMO radiator body, and radiator ring function as an RF lens array with a horizontally-directed radiation pattern adapted for terrestrial signal radiation; and
   at least one low-profile radiator disposed in the sunken central shelf providing a substantially circularly polarized or vertically-directed radiation pattern for receiving signals radiated from a satellite.

14. The automotive antenna system of claim 13 wherein each of the plurality of lobes is configured as a transverse electromagnetic (TEM) horn.

15. The automotive antenna of claim 13 wherein the dielectric substrate is comprised of a fluorinated thermoplastic.

16. The automotive antenna of claim 13 wherein the MIMO radiator body is comprised of an insulative core with a conductive outer cladding.

17. The antenna of claim 13 wherein the at least one low-profile radiator is comprised of a C-shape ring feeding a circular patch configured to receive signals from a satellite digital audio radio service (SDARS).

18. The automotive antenna of claim 13 wherein the at least one low-profile radiator is comprised of a pair of concentric ring conductors on an insulative circuit board configured to receive signals from a global navigation satellite system (GNSS).

19. The automotive antenna of claim 13 wherein the at least one low-profile radiator is comprised of a C-shape ring adjacent a circular patch which are disposed on an insulative disk and configured to receive signals from a satellite digital audio radio service (SDARS), and wherein the antenna further comprises: a feeding board upon which the insulative disk is mounted, wherein the feeding board includes conductive traces in electrical connection with opposing ends of the C-shape ring; an insulative circuit board suspended over the insulative disk and the feeding board; a pair of concentric ring conductors on a first side of the circuit board configured to receive signals from a global navigation satellite system (GNSS); and a pair of conductive probes disposed at a second side of the circuit board and configured to capacitively couple to the pair of concentric ring conductors, wherein the conductive probes are electrically connected to the C-shape ring; wherein the feeding board and the insulative circuit board are nested within the outer rim on the central shelf of the MIMO radiator body.

20. The automotive antenna of claim 13 further comprising a ground plate adjacent a lower surface of the dielectric substrate, wherein the ground plate includes a plurality of apertures to accommodate respective coaxial cables for connecting to respective lobes and to the low-profile radiator.

* * * * *